US009841550B2

(12) United States Patent
Li

(10) Patent No.: US 9,841,550 B2
(45) Date of Patent: Dec. 12, 2017

(54) BACKLIGHT MODULE AND DISPLAY DEVICE

(71) Applicants: BOE TECHNOLOGY GROUP CO., LTD., Beijing (CN); BEIJING BOE CHATANI ELECTRONICS CO., LTD., Beijing (CN)

(72) Inventor: Tianlong Li, Beijing (CN)

(73) Assignees: BOE TECHNOLOGY GROUP CO., LTD., Beijing (CN); BEIJING BOE CHATANI ELECTRICS CO., LTD., Beijing (CN)

( * ) Notice: Subject to any disclaimer, the term of this patent is extended or adjusted under 35 U.S.C. 154(b) by 0 days.

(21) Appl. No.: 14/801,102

(22) Filed: Jul. 16, 2015

(65) Prior Publication Data

US 2016/0209571 A1    Jul. 21, 2016

(30) Foreign Application Priority Data

Jan. 16, 2015    (CN) .......................... 2015 1 0022959

(51) Int. Cl.
    *F21V 7/04*    (2006.01)
    *F21V 8/00*    (2006.01)

(52) U.S. Cl.
    CPC ......... *G02B 6/0053* (2013.01); *G02B 6/0051* (2013.01); *G02B 6/0083* (2013.01)

(58) Field of Classification Search
    CPC .. G02B 6/0088; G02B 6/0068; G02B 6/0086; G02B 6/005; G02B 6/0053; G02B 6/0076; G02B 6/008
    USPC ................................................ 362/600–634
    See application file for complete search history.

(56) References Cited

U.S. PATENT DOCUMENTS

| 2004/0130880 A1 | 7/2004 | Min et al. |
| 2006/0055839 A1 | 3/2006 | Hirao et al. |
| 2011/0141397 A1* | 6/2011 | Lee ...................... G02B 6/0083 362/606 |

(Continued)

FOREIGN PATENT DOCUMENTS

| CN | 100432787 C | 11/2008 |
| CN | 102105737 A | 6/2011 |

(Continued)

OTHER PUBLICATIONS

First Chinese Office Action dated May 5, 2016; Appln. No. 201510022959.X.

(Continued)

*Primary Examiner* — William Carter
(74) *Attorney, Agent, or Firm* — Ladas & Parry LLP

(57) ABSTRACT

A backlight module and a display device are disclosed. The backlight module comprises a lamp group; at least one prism sheet having a first edge near a side of the lamp group; a light shielding sheet having an inner edge corresponding to the side of the lamp group for defining a light emitting region of the backlight module. A distance between the first edge of the prism sheet and the lamp group is greater than or equal to a distance between the inner edge of the light shielding sheet and the lamp group. A light leakage in front of the lamps is improved effectively by increasing the distance between the prism sheet and lamp group, so that light intensity of light emitted from the lamp group is reduced upon reaching the prism sheet.

16 Claims, 4 Drawing Sheets

(56) References Cited

U.S. PATENT DOCUMENTS

| | | | | |
|---|---|---|---|---|
| 2012/0002441 A1* | 1/2012 | Yabe | ............ | G02B 6/002 362/607 |
| 2012/0236231 A1* | 9/2012 | Choi | ............ | G02B 6/009 362/382 |
| 2012/0262941 A1* | 10/2012 | Min | ............ | H01L 25/0753 362/607 |

FOREIGN PATENT DOCUMENTS

| | | |
|---|---|---|
| CN | 104501051 A | 4/2015 |
| JP | 2013-178907 A | 9/2013 |
| WO | 03/083565 A1 | 10/2003 |

OTHER PUBLICATIONS

Second Chinese Office Action dated Nov. 28, 2016; Appln. No. 201510022959.X.

* cited by examiner

BACKLIGHT MODULE AND DISPLAY DEVICE

FIELD

The present disclosure is related to a backlight module and a display device including the backlight module.

BACKGROUND

Backlight module is used for providing a light source for a liquid crystal display. The light emitting efficiency of the backlight module affects display quality of the liquid crystal display directly. A pattern or a character displayed on the liquid crystal display is a modulation result of lights emitted from the backlight module. FIG. 1 (a) and FIG. 1 (b) are a front view and sectional view of a backlight module known by the inventors, respectively, FIG. 2 is an enlarged view of part A shown in FIG. 1 (b). The backlight module mainly includes a light reflecting sheet 11, a light guide plate 12, a diffuser sheet 13, a prism sheet 14, a light shielding sheet 15, a sealant frame 16, and a lamp group 17.

At present, the light guide plate used in the backlight module can be divided into two kinds of light guide plates, that is, a flat light guide plate and a wedge light guide plate. For example, the backlight modules as illustrated in FIG. 1 (a), FIG. 1 (b) and FIG. 2 use a wedge light guide plate as the light guide plate 12. However, each of those two kinds of the light guide plates may lead to light leakage. This is because most of light sources used in the backlight module are point light sources. If the point light source is placed too close to a prism sheet, lights may be reflected or refracted directly by prisms on the prism sheet, thus generating strong lights in front of the lamp, which leads to light leakage in front of the lamp.

For example, in FIG. 2, the lamp group 17 is a point light source. The prism sheet 14 and the light shielding sheet 15 typically have an overlapping portion at a position close to the lamp group 17, so that a distance between the prism sheet 14 and the lamp group 17 is small, thus light leakage occurs in front of the lamps. FIG. 3 (a) and FIG. 3 (b) are schematic views showing a light leakage in front of the lamps.

With development of display products to be light weight, compact, and aesthetic appealing, more and more backlight module use the wedge light guide plate to meet compactness requirement. However, the wedge light guide plate may aggravate the light leakage in front of the lamps of the backlight module, resulting in difficult image processing. Thus, the light leakage in front of the lamp is always a difficult and lingering issue to be addressed in a backlight module.

SUMMARY

The present disclosure provides a backlight module and a display device for improving a light leakage in front of lamps in the backlight module.

In one aspect, there is provided a backlight module. The backlight module comprises a lamp group; at least one prism sheet having a first edge near a side of the lamp group; a light shielding sheet having an inner edge corresponding to the side of the lamp group for defining a light emitting region of the backlight module. A distance between the first edge of the prism sheet and the lamp group is greater than or equal to a distance between the inner edge of the light shielding sheet and the lamp group.

In one example, the first edge comes to contact with the inner edge.

In one example, the backlight module further comprises a diffuser sheet having a second edge near the lamp group. A distance between the second edge of the diffuser sheet and the lamp group is smaller than a distance between the first edge of the prism sheet and the lamp group.

In one example, the backlight module further comprises a light guide plate. The lamp group is disposed on a flexible printed circuit board (PCB), a side of the flexible PCB provided with the lamp group having a portion extending beyond the lamp group and at least partially overlapping with the light guide plate.

In one example, the light guide plate is a wedge light guide plate comprising a flat portion and a wedge portion connected with the flat portion and having a thickness reduced gradually towards the flat portion, both the lamp group and the second edge of the diffuser sheet being located on a side of the wedge portion.

In one example, the portion of the flexible PCB extending beyond the lamp group at least partially overlaps with the diffuser sheet.

In one example, the backlight module comprising two prism sheets with extending directions of prisms of the two prism sheets perpendicular to each other.

In one example, the prism sheet further comprises at least one protrusion near the side of the lamp group. The protrusion part is attached with the light shielding sheet.

In one example, the prism sheet further comprises a plurality of protrusions near the side of the lamp group. The plurality of protrusions are uniformly arranged in a predetermined spacing along the first edge.

In one example, the protrusion part has a shape of a rectangle, a square, a triangle, a trapezoid, or arc shape.

In another aspect, there is provided a display device including the backlight module according to the present disclosure described above.

In the present disclosure, by increasing the distance between the prism sheet and the lamp group, the intensity of the lights emitted by the lamp group and reaching the prism sheet is reduced, thus reducing light refraction and reflection at edge regions of the prism sheet. This improves the light leakage in front of lamps effectively, and enables a uniform and appealing image quality.

BRIEF DESCRIPTION OF THE DRAWINGS

A simple explanation will be made to the attached drawings used in the embodiments in the following so as to describe the technical solutions in the embodiments of the present disclosure, obviously, the drawings appeared in the following description are a part of the embodiments of the present disclosure only, and various other drawings can be obtained by those of ordinary skilled in the art without creative labor based on these drawings mention above.

FIG. 1 (b) is a sectional view of the backlight module illustrated in FIG. 1 (a);

FIG. 7 (b) is a front view of a backlight module in an embodiment of the present disclosure.

Figure 1A:
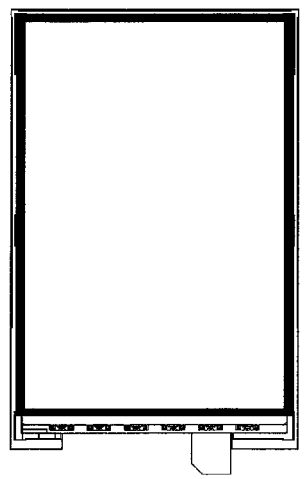
FIG. 1 (a) is a front view of a backlight module known by the inventors.
Figure 1B:
Figure 2:
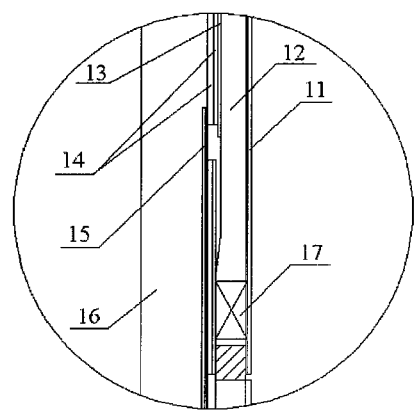
FIG. 2 is a enlarged view of part A in FIG. 1 (b)

In the drawings, 11: a light reflecting plate; 12: a light guide plate; 13, 23: a diffuser sheet; 14, 24: a prism sheet; 201: a first edge; 202: an inner edge; 203: a second edge; 204: a boundary; 15: a light shielding sheet; 16: a sealant frame; 17: a lamp group; 28: a flexible PCB; 30: a display region; 31: a non-display region; 40: a protrusion.

DETAILED DESCRIPTION

Technical solutions according to the embodiments of the present disclosure will be described clearly and completely as below in combination with the drawings of the embodiments of the present disclosure, it is understood that the described embodiments are only a part of but not all of exemplary embodiments of the present disclosure. Based on the embodiments in the present disclosure, various other embodiments can be obtained by those of ordinary skilled in the art without creative labor and those embodiments shall fall into the protection scope of the present disclosure.

Figure 4:
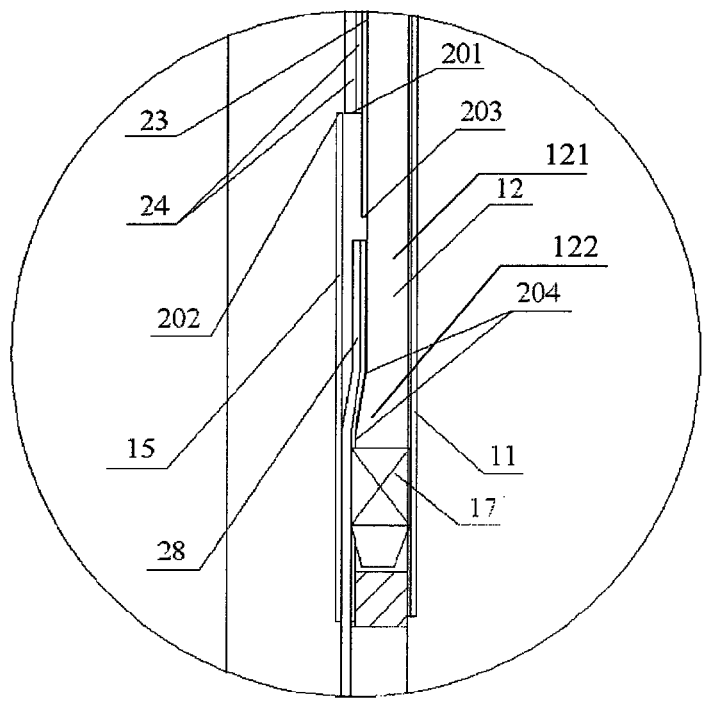
FIG. 4 is a sectional view of a backlight module in an embodiment of the present disclosure.

Firstly, a backlight module is provided according to the present disclosure, as shown in a sectional view of FIG. 4. The backlight module includes a lamp group 17 and at least one prism sheet 24 having a first edge 201 on a side close to the lamp group 17. The backlight module further includes a light shielding sheet 15 having an inner edge 202 for defining a light emitting region of the backlight module on a side of the light shielding sheet 15 corresponding to the lamp group 17. A distance between the first edge 201 and the lamp group 17 is greater than or equal to a distance between the inner edge 202 and the lamp group 17, so that a light intensity of light emitted from the lamp group 17 at the first edge 201 is small than or equal to a predetermined light intensity.

Herein, the predetermined light intensity is referred as the largest light intensity within which the light leakage can be controlled within an allowable range in production. The predetermined light intensity can be determined based on the backlight structures, models, and performance requirements, as long as the distance between the first edge 201 of the prism sheet 24 and the lamp group 17 is large enough to prevent the light leakage in front of the lamps.

It is obvious that the distance between the first edge 201 and the lamp group 17 cannot be infinite. In order to meet essential display requirements, the first edge 201 cannot enter into the display region of the display panel to be assembled.

In the present disclosure, a spacing in a backlight module structure is utilized to increase a distance between the first edge 201 of the prism sheet 24 and the lamp group 17 so that the light intensity is reduced when lights emitted from the lamp group 17 reach the prism sheet 24, thus reducing light refraction and reflection at the edge region of the prism sheet 24, efficiently improving light leakage in front the lamps, increasing display quality of an image, enabling more uniform and appealing images.

In one example, the first edge 201 and the inner edge 202 comes to contact in order to ensure stability of the backlight module structure to the most degree, and alleviate or eliminate light accumulation at the edge regions of the prism sheet 24, thus reducing light leakage resulted from strong lights in front lamps.

Figure 5:
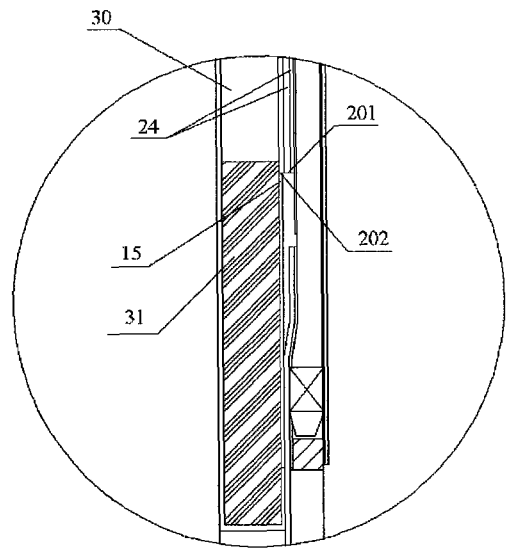
FIG. 5 is a sectional view of a backlight module after it is mounted onto a display panel in an embodiment of the present disclosure.

In case that the distance between the first edge 201 and lamp group 17 is greater than the distance between the inner edge 202 and the lamp group 17, the first edge 201 cannot come into the display region of the display panel to be assembled. For example, FIG. 5 is a sectional view of the backlight module after the display panel is mounted. The display panel includes a display region 30 and a non-display region 31. Both the first edge 201 of the prism sheet 24 and the inner edge 202 of the light shielding sheet 15 cannot invade the display region 30.

Further, the backlight module further includes a diffuser sheet 23 having a second edge 203 on a side of the diffuser sheet 23 near the lamp group 17. A distance between the second edge 203 and lamp group 17 is smaller than a distance between the first edge 201 and the lamp group 17.

To further improve light leakage in front of the lamps, the diffuser sheet 23 is enlarged in the present disclosure. That is, the second edge 203 of the diffuser sheet 23 is extended in a direction towards the lamp group 17, so that lights can be diffused better by the diffuser sheet 23 before reaching the prism sheet 24 so as to reduce local light intensity at the prism sheet 24.

Typically, the lamp group 17 is disposed on a flexible PCB 28, as illustrated in FIG. 4. The backlight module further includes a light guide plate 12. The flexible PCB 28 has a portion on a side of the lamp group 17. The portion extends beyond the lamp group 17 and at least partially overlaps with the light guide plate 12. By extending the flexible PCB 28, a light incident side of the light guide plate 12 can be shielded so that a part of lights in front of lamps are shielded, thus reducing light intensity in front of the lamps so as to alleviate the light leakage in front of the lamps.

The present disclosure can be applied to various types of backlight module, especially the backlight module using a wedge light guide plate as a light guide plate, which is beneficial to development of a compact backlight module. For example, the light guide plate 12 as illustrated in FIG. 4 is a wedge light guide plate. The wedge light guide plate includes a flat portion 121 and a wedge portion 122 connected with the flat portion 121. The lamp group 17 is located on a side of the wedge portion 122, which has a thickness gradually reduced towards the flat portion 121.

Figure 6:
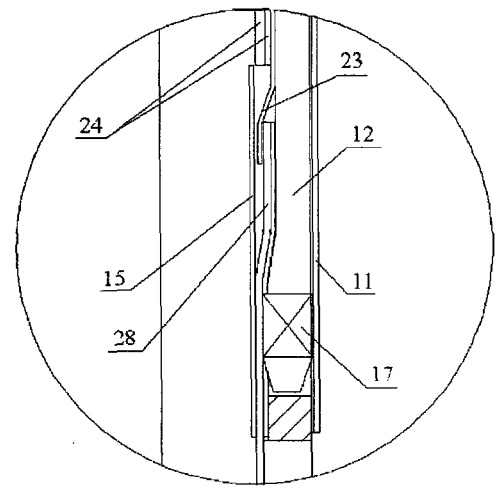
FIG. 6 is another sectional view of a backlight module in an embodiment of the present disclosure.

As described above, the light leakage in front of the lamps can be improved by enlarging the diffuser sheet 23 through extending the second edge 203 of the diffuser sheet 23 towards the lamp group 17. In the present disclosure, the second edge 203 is for example located on a side of the wedge portion. Furthermore, the portion of the flexible PCB 28 extending beyond the lamp group 17 at least partially overlaps with the diffuser sheet 23, as illustrated in FIG. 6. In the embodiment illustrated in FIG. 6, both the extended flexible PCB 28 and the extended diffuser sheet 23 are adopted, which can cooperate to further improve the light leakage in front of the lamps.

Figure 3A:
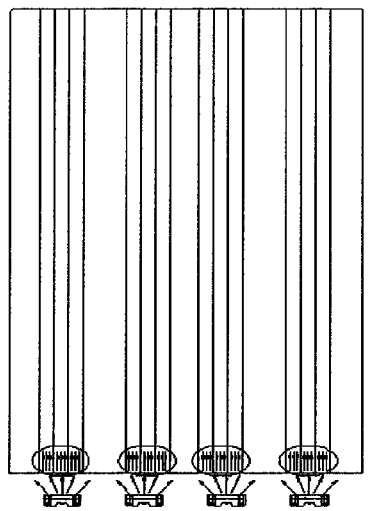
FIG. 3 (a) and FIG. 3 (b) are schematic views showing a light leakage in front of lamps.
Figure 3B:
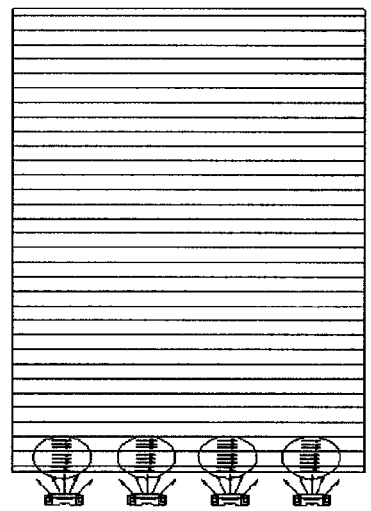

Typically, the backlight module includes two prism sheets 24 to enhance a brightness. Furthermore, the extending directions of the prisms of the two prism sheets 24 are perpendicular to each other, which can avoid interference fringes. For example, in FIG. 3 (a) and FIG. 3 (b), the extending directions of the prisms of the two prism sheets are 90° and 0°, respectively.

Figures 7A, 7B:
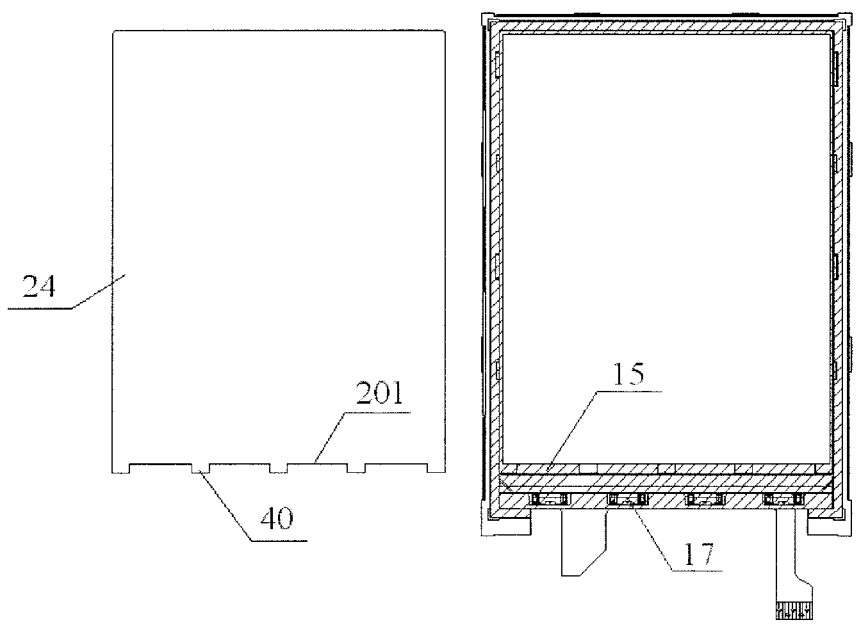
FIG. 7 (a) is a front view of a prism sheet in an embodiment of the present disclosure.

To enhance structure strength of the backlight module, the prism sheet 24 includes at least one protrusion 40 on a side near the lamp group 17, as shown in FIG. 7 (a) and FIG. 7 (b). The protrusion 40 is attached to the light shielding sheet 15.

In one example, a the prism sheet 24 includes a plurality of protrusion s 40 near the lamp group 17. The plurality of protrusions 40 are arranged uniformly in a predetermined interval along the first edge 201. When the backlight module is assembled, a double sided tape may be disposed on the protrusions 40, so that the light shielding sheet 15 is attached to the plurality of protrusions 40. Such design can improve the structure strength of the backlight module and present a more stable performance in a reliability test of the backlight module.

There is no limitation to a specific shape of the protrusion 40 in the present disclosure. The shape of the protrusion 40 may be any one of rectangle, square, triangle, trapezoid, or arc, or any combination thereof. The rectangular shape of the protrusion 40 facilitates the fabrication as well as the attachment of the double sided tape.

As another aspect of the present disclosure, a display device is provided according to the present disclosure. The display device includes a backlight module according to the present disclosure, and a liquid display panel assembled with the backlight module.

In the display device according to the present disclosure, by increasing the distance between the prism sheet and the lamp group, light intensity of light emitted from the lamp group is reduced upon reaching the prism sheet, thus the light leakage in front of the lamps is effectively improved, enabling a more uniform and appealing displayed image.

Further, the present disclosure is especially suitable to improve the light leakage in front of the lamps of the wedge light guide plate, thus the wedge light guide plate is preferably adopted in the display device according to the present disclosure, which facilitates the development of the display device towards light weight, compactness and aesthetic appealing.

The above embodiments are only for explaining the present disclosure and in no way limit the present disclosure. Those of ordinary skilled in the art can make various variations and modifications to the present disclosure without departure from the spirit and the scope of the present disclosure, thereby all equivalent technical solutions are intended to be included within the scope of the present disclosure as defined by the claims.

What is claimed is:

1. A backlight module comprising:
   a lamp group;
   at least one prism sheet having a first edge near a side of the lamp group;
   a light shielding sheet having an inner edge corresponding to the side of the lamp group for defining a light emitting region of the backlight module,
   a diffuser sheet having a second edge near the lamp group,
   a light guide plate, disposed on a flexible printed circuit board (PCB),
   wherein a distance between the first edge of the prism sheet and the lamp group is greater than or equal to a distance between the inner edge of the light shielding sheet and the lamp group,
   the light guide plate is a wedge light guide plate comprising a flat portion and a wedge portion connected with the flat portion and having a thickness reduced gradually towards the flat portion,
   a side of the flexible PCB provided with the lamp group having a portion extending beyond the lamp group and at least partially overlapping with the light guide plate, the portion of the flexible PCB extending beyond the lamp group at least partially overlaps with the diffuser sheet directly above the flat portion and is disposed at a same side of the light guide plate with the diffuser sheet.

2. The backlight module according to claim 1, wherein the first edge comes to contact with the inner edge.

3. The backlight module according to claim 1, wherein both the lamp group and the second edge of the diffuser sheet being located on a side of the wedge portion.

4. The backlight module according to claim 1, wherein the backlight module comprising two prism sheets with extending directions of prisms of the two prism sheets perpendicular to each other.

5. The backlight module according to claim 1, wherein the prism sheet further comprises at least one protrusion near the side of the lamp group, the protrusion being protruded along a direction dose to the side of the lamp group and attached with the light shielding sheet.

6. The backlight module according to claim 5, wherein the prism sheet further comprises a plurality of protrusions near the side of the lamp group, the plurality of protrusions being uniformly arranged in a predetermined spacing along the first edge.

7. The backlight module according to claim 1, wherein the portion of the flexible PCB extending beyond the lamp group at least partially contacts the diffuser sheet.

8. The backlight module according to claim 7, wherein the portion of the flexible PCB overlapping with the diffuser sheet is disposed at a side of the diffuser sheet away from the light guide plate.

9. A display device comprising a backlight module,
   the backlight module comprising: a lamp group;
   at least one prism sheet having a first edge near a side of the lamp group;
   a light shielding sheet having an inner edge corresponding to the side of the lamp group for defining a light emitting region of the backlight module,
   a diffuser sheet having a second edge near the lamp group,
   a light guide plate, disposed on a flexible printed circuit board (PCB),
   wherein, a distance between the first edge of the prism sheet and the lamp group is greater than or equal to a distance between the inner edge of the light shielding sheet and the lamp group,
   the light guide plate is a wedge light plate comprising a flat portion and a wedge portion connected with the flat portion and having a thickness reduced gradually towards the flat portion,
   a side of the flexible PCB provided with the lamp group having a portion extending beyond the lamp group and at least partially overlapping with the light guide plate, the portion of the flexible PCB extending beyond the lamp group at least partially overlaps with the diffuser sheet directly above the flat portion and is disposed at same side of the light guide plate with the diffuser sheet.

10. The display device according to claim 9, wherein the first edge comes to contact with the inner edge.

11. The display device according to claim 9, wherein both the lamp group and the second edge of the diffuser sheet being located on a side of the wedge portion.

12. The display device according to claim 9, wherein the backlight module comprising two prism sheets with extending directions of prisms of the two prism sheets perpendicular to each other.

13. The display device according to claim 9, wherein the prism sheet further comprises at least one protrusion near the side of the lamp group, the protrusion being protruded along a direction dose to the side of the lamp group and attached with the light shielding sheet.

14. The display device according to claim 13, wherein the prism sheet further comprises a plurality of protrusions near the side of the lamp group, the plurality of protrusions being uniformly arranged in a predetermined spacing along the first edge.

15. The backlight module according to claim 9, wherein the portion of the flexible PCB extending beyond the lamp group at least partially contacts the diffuser sheet.

16. The backlight module according to claim 15, wherein the portion of the flexible PCB overlapping with the diffuser sheet is disposed at a side of the diffuser sheet away from the light guide plate.

\* \* \* \* \*